US007949250B1

(12) United States Patent
Tsai

(10) Patent No.: US 7,949,250 B1
(45) Date of Patent: May 24, 2011

(54) ELECTRO-MECHANICAL SHUTTER CONTROL

(75) Inventor: Richard Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/626,396

(22) Filed: Nov. 25, 2009

(51) Int. Cl.
  *G03B 7/00* (2006.01)
  *G03B 9/08* (2006.01)
(52) U.S. Cl. .................................. 396/213; 396/463
(58) Field of Classification Search .................. 396/213, 396/463–470
  See application file for complete search history.

(56) References Cited

U.S. PATENT DOCUMENTS

| 3,762,288 | A | | 10/1973 | Schmidt |
| 4,841,327 | A | * | 6/1989 | Yamamoto et al. ............ 396/257 |
| 5,113,210 | A | * | 5/1992 | Kashiyama et al. ............ 396/86 |
| 7,178,998 | B2 | * | 2/2007 | Usuda et al. ................. 396/484 |
| 7,513,701 | B2 | | 4/2009 | Naganuma |
| 2003/0012573 | A1 | * | 1/2003 | Sekizawa et al. ............ 396/463 |
| 2004/0105028 | A1 | | 6/2004 | Watanabe |
| 2008/0175583 | A1 | | 7/2008 | Seita |

FOREIGN PATENT DOCUMENTS

WO  WO-2007065964 A1  6/2007

OTHER PUBLICATIONS

Janesick, James, et al., "Developments and Applications of High-Performance CCD and CMOS Imaging Arrays", Annual Review of Nuclear Particle Science, vol. 53, 2003, 53:263-300, doi: 10.1146/annurev.nucl.53.041002.110431, (pp. 263-300 and Contents vii).

* cited by examiner

*Primary Examiner* — W. B. Perkey
*Assistant Examiner* — Noam Reisner
(74) *Attorney, Agent, or Firm* — Blakey, Sokoloff, Taylor & Zafman LLP

(57) ABSTRACT

A method in a camera device having an image sensor and an electro-mechanical shutter mechanism is as follows. A constant drive current is applied to the shutter mechanism to close shutter at the end of a first exposure. Then, a decaying drive current is applied to the shutter mechanism during a readout interval for the first exposure. Other embodiments are also described and claimed. Other embodiments are also described and claimed.

14 Claims, 4 Drawing Sheets

ELECTRO-MECHANICAL SHUTTER CONTROL

An embodiment of the invention relates to digital camera devices that have an electro-mechanical shutter mechanism for accurate control of the exposure time of a microelectronic imaging sensor of the device. Other embodiments are also described.

BACKGROUND

Digital camera devices use a microelectronic imaging sensor (image sensor) to capture digital images of a scene. The camera devices are often integrated into portable or battery-operated devices such as dedicated video or still cameras, cellular phones and multi-function or smart phones.

For improved image capture quality, some digital camera devices use the more traditional, electro-mechanical shutter mechanism, rather than a purely electronic shutter, for controlling exposure of the image sensor. In an electro-mechanical shutter, an actuator mechanism often referred to as a voice coil motor is coupled to move one or more blades, in response to being energized by an input drive current. When the motor is not energized, the blades can be biased into a shutter open or a shutter closed state, using for example a small spring.

Electro-mechanical shutters are used in digital cameras in the following manner. In one instance, the shutter blades are biased open by the spring, when the camera is first enabled or powered-on. This is referred to as a "normally open" state, which allows video of the scene to be captured by the image sensor and displayed to the user, during a preview or viewfinder mode of operation. Next, when the user actuates the shutter release button to take a picture (also referred to as an "exposure"), the image sensor is electrically reset to start an integration interval during which the sensor responds to light from the scene to form the captured image. At the end of the integration interval, the motor is automatically energized, by raising its drive current. The motor responds by moving the blades to a shutter closed state. This stops the sensor from further responding to light from the scene. At this point, the electrical signals representing the captured image are read from the sensor (referred to as a readout operation interval) and stored in memory, for subsequent processing and/or viewing. Upon completion of readout, the motor is then de-energized by lowering the drive current to essentially zero. This allows the spring to bias the blades back into the shutter open condition, which allows the viewfinder mode to resume (letting the user prepare for taking the next picture).

The above-described shutter mechanism is referred to as a unipolar shutter, where the drive current is raised and then maintained at a constant level for essentially the entire duration of readout, in only one direction. In this case, the drive current is raised to close the blades, and then returned to zero, at which point the soft spring urges the blades to their open state.

There are situations where the blades can become stuck in the closed or in an almost closed state when the motor has been de-energized, due to electrostatic forces, which the soft spring cannot overcome. To avoid this problem, a bipolar shutter mechanism has been suggested. In that case, the motor is also operated in reverse, i.e. its drive current is "raised" in the opposite direction. The motor responds to this by moving the blades in the reverse direction, in this example to the shutter open state.

With increasingly greater functionality being integrated into portable devices, the design of the constituent components or functions of the device is typically carefully scrutinized, to ensure that power consumption is reduced whenever possible. The digital camera device is no exception. Thus, in the case of the bipolar shutter, to maintain low power consumption, the drive current is pulsed in both directions (rather than being kept "on" for the entire duration of a readout interval or an integration interval). An additional mechanism, such as one that uses a soft spring, is provided that helps maintain the blades in their open or closed states when the motor is de-energized. This helps lower the overall power consumption of the camera device, because the motor's drive current is only turned on for a brief interval at the end of each exposure and at the start of the next exposure.

SUMMARY

As discussed above in the Background, in an effort to obtain lower power consumption, the drive current of a bipolar electro-mechanical shutter mechanism should be pulsed over as short an interval as possible. However, when shortening the close shutter pulse at the end of a given exposure, the quality of the captured image for that exposure may suffer due to noise (e.g., banding or other visible artifacts). This image noise is likely induced during readout while there is power supply ringing or ground bounce in the image sensor's supply and/or reference or ground connections. The latter may be caused by the pulsed drive current of the shutter mechanism motor, whose ground is in most cases connected to that of the image sensor. That pulse, which is needed to close the shutter at the end of a given exposure, may cause ringing or ground bounce during the readout interval for that exposure.

In accordance with an embodiment of the invention, a method in a camera device having an image sensor and an electro-mechanical shutter mechanism includes the following operations. A drive current of the shutter mechanism is forced to change rapidly, from a neutral range to a close shutter range, at the end of a first exposure taken by the image sensor. Then, the drive current is forced to change slowly, from the close shutter range to an open shutter range that is opposite in polarity, during readout of the first exposure. This may help alleviate visible artifacts in the captured image, by reducing ringing on a power supply line or ground bounce during the readout interval.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
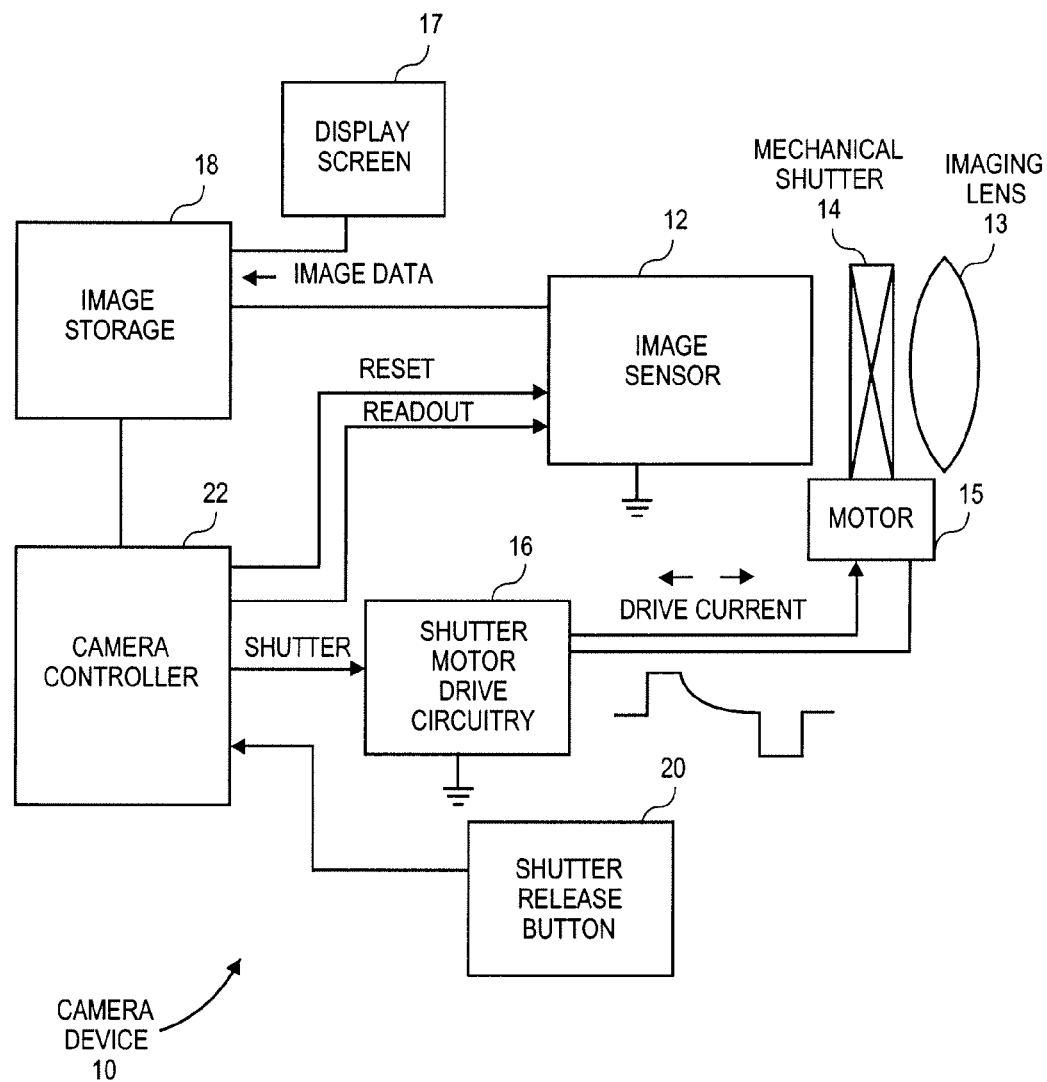
FIG. 1 is a combined circuit schematic and block diagram of a camera device in accordance with an embodiment of the invention.
Figure 4:
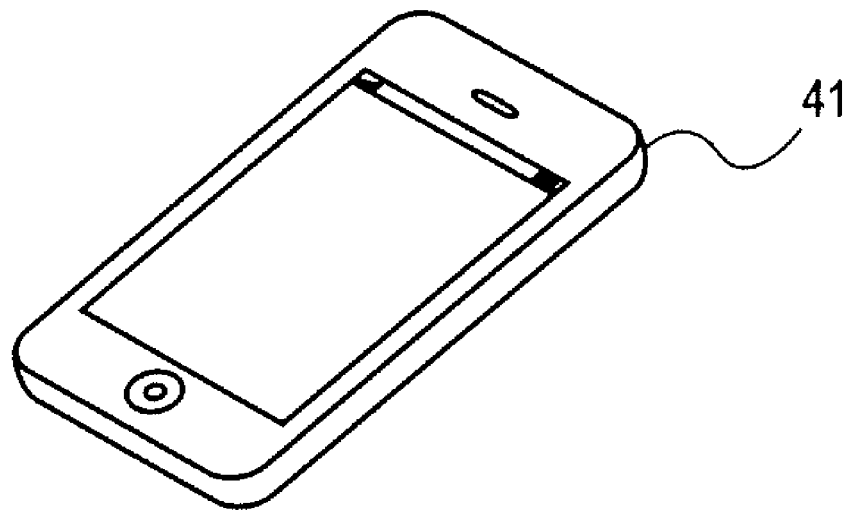
FIG. 4 depicts several types of camera devices in which an embodiment of the invention can be implemented.
Figure 4:
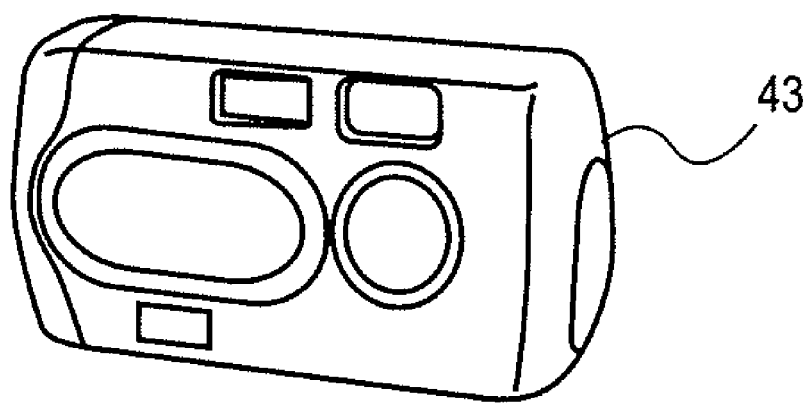

FIG. 1 is a combined circuit schematic and block diagram of a camera device 10 in accordance with an embodiment of the invention. As depicted in FIG. 4, the device 10 may be any one of several different types of camera devices including a multi-function smart phone 41 such as an iPhone™ device by Apple Inc., a camera (mobile) phone, and a dedicated high end digital camera 43, a notebook personal computer, and a desktop personal computer, all of which have a built-in digital camera. The digital camera functionality is obtained using a microelectronic image sensor 12 on which light from the scene to be captured has been gathered by an imaging lens 13. A mechanical shutter 14 may include shutter blades that open to allow light from the scene to impinge on the sensor, and close to prevent light from the scene from impinging on the sensor. The shutter 14 is part of an electro-mechanical shutter mechanism that also includes a motor 15 (e.g., a voice coil motor) which is mechanically coupled to force the blades into the open and closed states, and drive circuitry 16 that generates the drive current required by the motor 15 to actuate the blades. In this case, the shutter 14 also has a hold mechanism that holds the blades open or closed once actuated, allowing the motor 15 to be de-energized following actuation.

The sensor 12 responds to the incident light and collects photo-generated charge or forms image signals during an integration interval (or exposure interval). At the end of the integration interval, the image signals are read (including being digitized) and transferred (as a captured digital image or "exposure") to image storage 18, during a readout interval. The image storage 18 may include sufficient non-volatile memory suitable to store many digital images captured by the sensor 12.

A camera controller 22 (e.g., implemented as a combination of programmed data processing components and hard-wired logic circuitry) can manage the process of taking exposures. It does so by generating various commands that are signaled to the components of the camera device 10, in response to a user of the device 10 actuating a shutter release button 20, to take an exposure. The button 20 may be a physical button on an outside surface of the device 10, or it may be a virtual button displayed on a touch screen of the device 10.

The commands from the camera controller 22 can be as follows. A Reset command causes the pixels of a sensor array in the image sensor 12 to be initialized so as to be ready to respond to light and form image signals, for a new exposure. A Shutter command signals the shutter motor drive circuitry 16 to generate, apply or force the appropriate drive current to the motor 15, so that the shutter 14 is moved or actuated into the desired state (open or closed). A Readout command is asserted following the end of an integration interval, to cause the image signals to be read from the sensor 12 as a captured image, and then written to the storage 18 (where it is associated with an exposure identification). The captured image may be stored in a file having any suitable digital image format (e.g., jpeg, exif).

Note that the motor 15, the drive circuitry 16, and the image sensor 12 may have their ground or reference nodes connected or shared, as shown by the common ground symbol in FIG. 1. This may create undesired ringing or ground bounce caused by a pulsing motor drive current, which can corrupt the captured image from the image sensor 12 during the readout interval. This situation may be alleviated, by slowing down a transition in the drive current as explained next.

Figure 2:
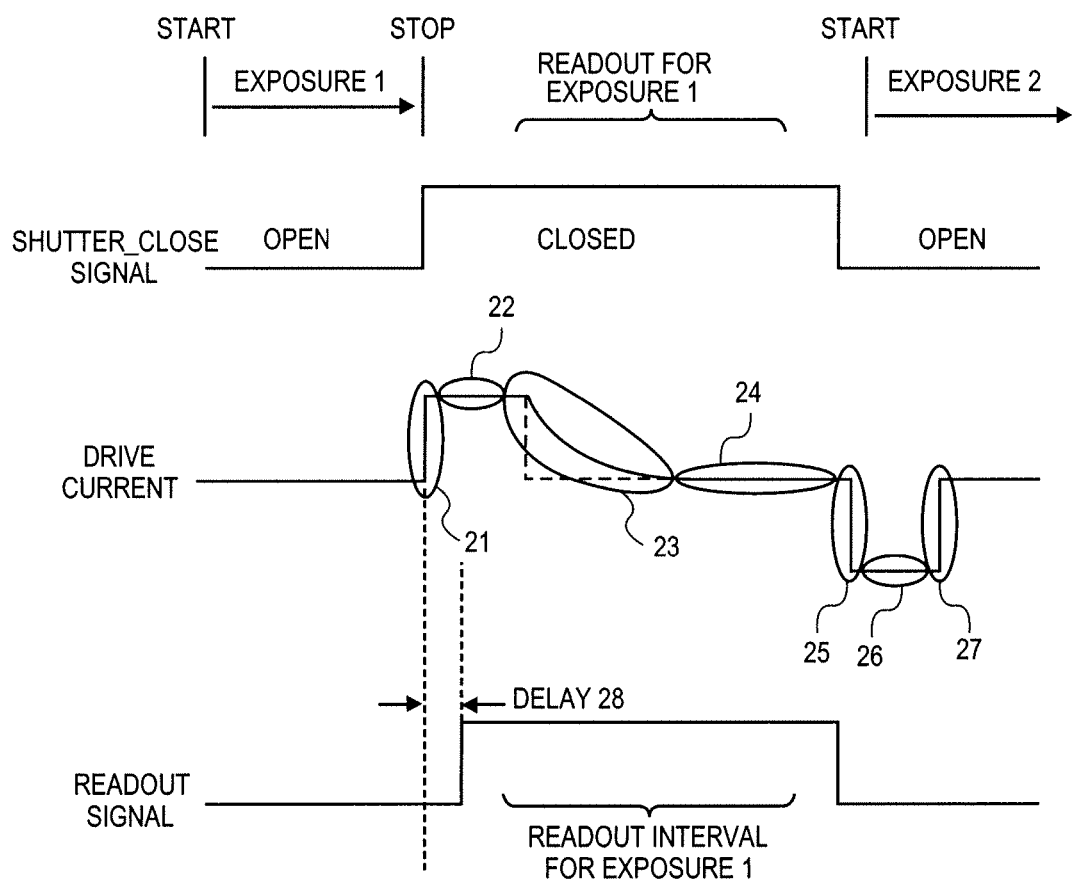
FIG. 2 illustrates waveforms for various signals in the camera device of FIG. 1.

Referring now to FIG. 2, time domain waveforms for various signals in the camera device 10 of FIG. 1 are shown, to illustrate an embodiment of the invention. The waveforms begin at the start of Exposure 1 and end during the subsequent Exposure 2.

The Shutter_Close signal is deasserted during the integration interval of Exposure 1, indicating that the shutter is open during that interval. Note that just prior to Exposure 1, the camera device 10 may have been operating in a preview or viewfinder mode, where its image sensor 12 was capturing and displaying video of the scene on the display screen 17, allowing its user to preview the scene in preparation for taking a picture (Exposure 1). The Shutter_Close signal may be asserted at the end of the integration interval for Exposure 1, indicating that the shutter is to be closed. In one embodiment, the Shutter_Close signal remains asserted until the completion of readout for Exposure 1; thereafter, it is again de-asserted, indicating that Exposure 1 has been completed and that the shutter is to open again, in preparation for the next exposure (Exposure 2). The latter may now be taken, while the shutter is open.

The Drive_Current signal begins at a neutral level (also referred to as a neutral range) while the Shutter_Close signal is deasserted. The neutral range may be essentially zero amperes, to help reduce power consumption. In response to the Shutter_Close being asserted, the drive current is raised rapidly to a close shutter level or range—this occurs during an interval 21. The drive current may then be maintained in this range (constant), during an interval 22. Sometime during the interval 22, the shutter 14 (or its blades) actually closes. With the shutter now being held closed by another mechanism (e.g., a soft spring detent), the drive current slowly changes to an open shutter level. In the example shown, the change starts with interval 23 in which the drive current decays back to the neutral range, then stays constant (at neutral) in interval 24, and then makes a rapid change from neutral to an opposite polarity, open shutter level in interval 25. In another example, the decay rate may be even lower such that interval 24 is essentially non-existent—interval 23 would in that case be followed immediately by interval 25. In both cases, the drive current may then be maintained (constant) at the open shutter level, during interval 26. Sometime during interval 26, the shutter 14 (or its blades) actually opens. This is followed by interval 27 where the Drive_Current is returned to neutral (since it assumed that the hold mechanism is able to maintain the shutter open state without assistance from the motor).

To help reduce power consumption, the intervals 22, 26 of the Drive Current should be as short as possible (while still being long enough to ensure that the shutter 14 is able to transition in each case). Also, the area under the decaying portion of the Drive Current curve (interval 23) should be as small as possible to reduce power consumption, while still able to alleviate the ground bounce or ringing by not being too abrupt. As an example, the Drive Current's rapid changes, namely in intervals 21, 25, and 27, may be in accordance with a step function while the slow change in interval 23 is in accordance with an exponential or other monotonically decaying function (e.g., a linear function).

The Readout Signal may remain deasserted until an exposure has been completed, when it is time to transfer the captured image to storage 18. The onset of readout may be delayed, by delay interval 28, relative to the Shutter_Close signal being asserted, so that sufficient time is allowed for the shutter 14 to actually close. No further delay may be necessary and readout may then start, even though the Drive Current is still "on". The readout interval may extend from interval 22 to interval 24. The length of the readout interval depends on various factors, including the architecture of the pixels in the sensor array, the total number of pixels to be read, their control and bit line architecture, and how fast the analog to digital conversion of the analog image signals and their subsequent writing to image storage 18 can be performed.

Figure 3:
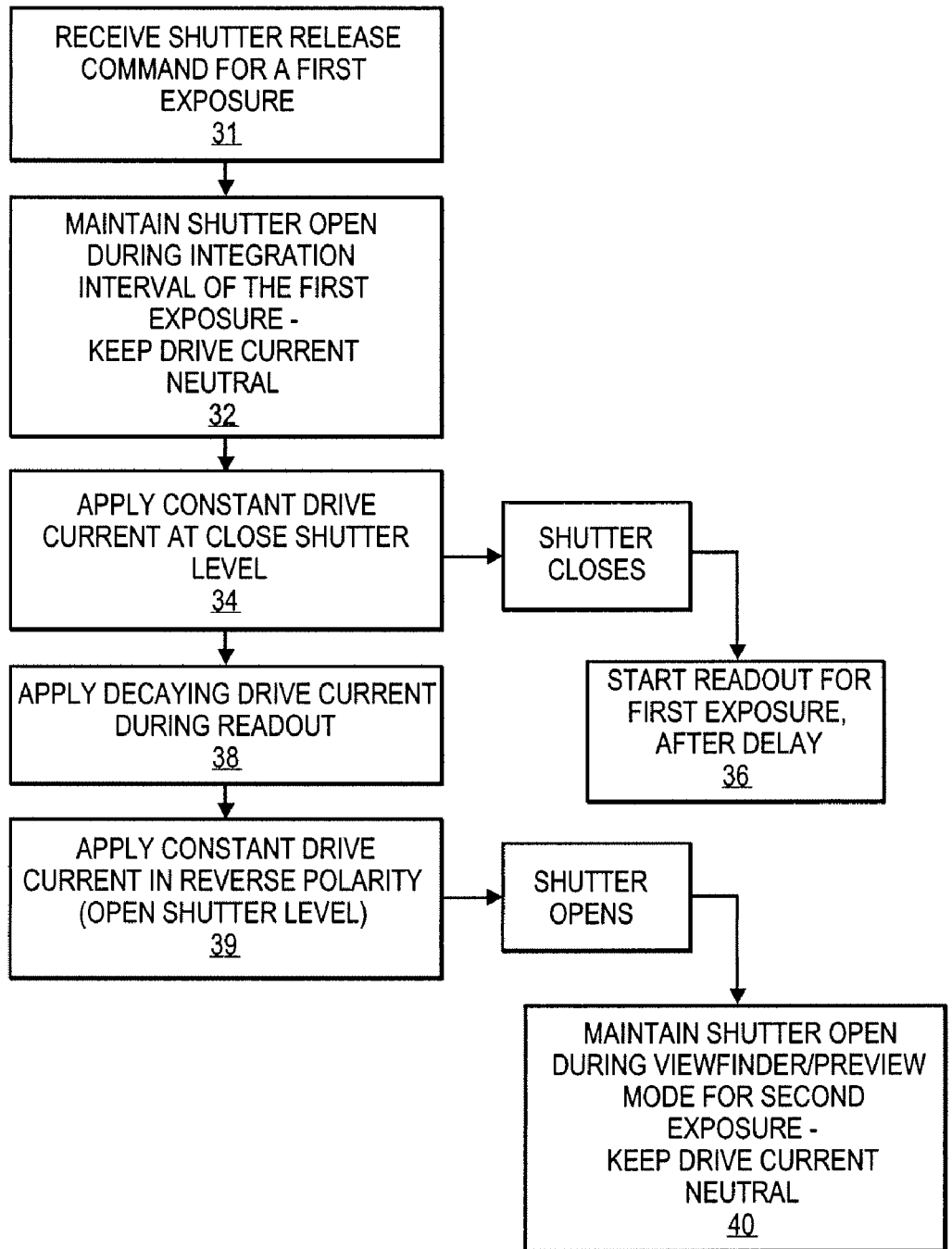
FIG. 3 is flow diagram of a process for taking a picture in a camera device, in accordance with an embodiment of the invention.

FIG. 3 is flow diagram of a process for taking a picture in the camera device 10, in accordance with an embodiment of the invention. The description of the process operations below may occasionally refer to the waveform timing illustrated in FIG. 2 and the block diagram of FIG. 1. Unless otherwise specified, the order of the operations may be varied from that which is shown in FIG. 3. The process may begin when a user has turned on the camera device 10 or enabled the camera functionality, to take pictures. If a preview mode is provided, then the controller 22 commands the shutter to open (Drive Current is pulsed to the open shutter level). The shutter then stays open continuously, allowing video of the scene to be captured by the image sensor 12 and displayed on the display screen 17. Note that in this type of preview mode where the shutter 14 remains open continuously, a purely electronic shutter of the image sensor 12 is needed, to capture the sequence of image frames in the video. The process then continues with operation 31.

In operation 31, a shutter release command is received to take a first exposure. The controller 22 may receive such a command from a user-actuated, shutter release button 20. In response, the controller signals the image sensor 12 to reset its pixel array and then release the pixel array at the start of an integration interval, for the first exposure. The sensor 12 starts to collect photo-generated charge for the first exposure, and the shutter continues to stay open during this time interval (operation 32) while the Drive_Current stays neutral. The process then continues with operation 34.

At the end of the integration interval for the first exposure, the controller 22 asserts the Shutter_Close signal, to close the shutter and thereby stop the sensor 12 from collecting further photo-generated charges. The motor drive circuitry 16 responds by applying a constant drive current at the close shutter level, in intervals 21 and 22 (operation 34). This causes the shutter 14 to close, and then readout begins for the first exposure, following a brief delay interval 28 to ensure that the shutter 14 has in fact closed (operation 36). The process then continues with operation 38.

In operation 38, a decaying drive current is applied during readout for the first exposure. This may be triggered by the controller 22 further signaling the motor drive circuitry 16, at the start of interval 23; alternatively, the motor drive circuitry may automatically start to apply the decaying current at the end of the interval 22, without waiting for a trigger from the controller 22. The process then continues with operation 39.

Upon completion of readout for the first exposure, the camera device prepares for the subsequent exposure by opening the shutter 14 and resuming preview mode. Thus, in operation 39, a constant drive current at the open shutter level is applied to the motor 15 (having opposite polarity to the close shutter level). This may be triggered by the controller 22 deasserting its Shutter_Close signal as shown in FIG. 2. After the shutter opens, it is maintained open during viewfinder or preview mode, enabling the user to take the second exposure (operation 40). The process may now loop back and resume with operation 31 where a shutter release command for the second exposure can be expected.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, in FIG. 2, the close shutter level of the Drive Current is shown as being above neutral. An alternative would be to reverse this polarity by suitably arranging the motor 15. In that case, the Drive Current waveform would be a flipped or mirrored version of FIG. 2, i.e. across the neutral (horizontal) line.

What is claimed is:

1. A camera device comprising:
   an image sensor to capture an image of a scene;
   an electro-mechanical shutter mechanism that opens to allow light from the scene to impinge on the image sensor, and closes to prevent light from the scene from impinging on the image sensor, in response to a drive current,
      wherein the shutter mechanism is to open in response to the drive current reaching an open shutter level, and close in response to the drive current reaching a close shutter level that is opposite in polarity to the open shutter level; and
   a controller to cause the drive current to a) rapidly change to the close shutter level then b) slowly change to the open shutter level.

2. The camera device of claim 1 further comprising motor drive circuitry that responds to the controller and forces the drive current to change slowly from the close shutter level to the open shutter level in a way that reduces the incidence of power supply ringing and/or ground bounce for the image sensor during subsequent readout.

3. The camera device of claim 1 wherein the controller is to cause the drive current to slowly change from the close shutter level to the open shutter level, by making a slow change to a neutral level in a first interval, followed by being constant at the neutral level in a second interval, followed by making a rapid change from the neutral level to the open shutter level in a third interval.

4. The camera device of claim 1 wherein the controller is to signal that a first exposure be taken using the image sensor, and wherein the drive current's rapid change to the close shutter level occurs at the end of an integration interval for the first exposure during which the sensor is responding to light for taking the first exposure by collecting photo-generated charges.

5. The camera device of claim 4 wherein the controller is to signal a pixel array reset, then a release of the pixel array, and then start integration interval, all in response to a shutter release command from the user.

6. The camera device of claim 4 wherein the controller is to perform readout of the first exposure while the drive current changes slowly toward the shutter open level, and then prepare for a second exposure thereafter.

7. The camera device of claim 6 wherein the controller is to prepare for the second exposure by enabling a preview or viewfinder mode while the shutter remains open and is ready to respond to another shutter release command from the user.

8. The camera device of claim 1 wherein the drive current's rapid change is in accordance with a step function and the drive current's slow change is in accordance with an exponential or other decaying function.

9. A method in a camera device having an image sensor and an electro-mechanical shutter mechanism, comprising:
   forcing a drive current of the electro-mechanical mechanism to change rapidly from a neutral range to a close shutter range, at the end of a first exposure taken by the image sensor; and then
   forcing the drive current to change slowly from the close shutter range to an open shutter range, during readout of the first exposure.

10. The method of claim 9 wherein said forcing the drive current to change slowly from the close shutter range to the open shutter range comprises:
   forcing the drive current to change slowly from the close shutter range to the neutral range and then rapidly from the neutral range to the open shutter range.

11. The method of claim 9 wherein the drive current's rapid change is in accordance with a step function and the drive current's slow change is in accordance with an exponential or other decaying function.

12. A method in a camera device having an image sensor and an electro-mechanical shutter mechanism, comprising:
   applying a constant drive current to the shutter mechanism to close shutter at the end of a first exposure; then
   applying a decaying drive current to the shutter mechanism during a readout interval for the first exposure.

13. The method of claim 12 further comprising:
   after applying the decaying drive current, applying an opposite polarity constant drive current to the shutter mechanism to open shutter to prepare for a second exposure.

14. The method of claim 13 wherein the decaying drive current reaches a neutral level, before applying the opposite polarity constant drive current.

* * * * *

UNITED STATES PATENT AND TRADEMARK OFFICE
CERTIFICATE OF CORRECTION

| | | |
|---|---|---|
| PATENT NO. | : 7,949,250 B1 | Page 1 of 1 |
| APPLICATION NO. | : 12/626396 | |
| DATED | : May 24, 2011 | |
| INVENTOR(S) | : Richard Tsai | |

It is certified that error appears in the above-identified patent and that said Letters Patent is hereby corrected as shown below:

On the title page, in item (74), in column 2, in "Attorney, Agent or Firm", line 1, delete "Blakey," and insert -- Blakely, --, therefor.

Signed and Sealed this
Twenty-seventh Day of December, 2011

David J. Kappos
*Director of the United States Patent and Trademark Office*